(12) United States Patent
DelGaudio et al.

(10) Patent No.: US 7,809,598 B2
(45) Date of Patent: Oct. 5, 2010

(54) COMPUTER-IMPLEMENTED METHOD, TOOL, AND PROGRAM PRODUCT FOR SCHEDULING AN INFORMATION TECHNOLOGY (IT) MIGRATION

(75) Inventors: Carol DelGaudio, Williston, VT (US); Scott D. Hicks, Underhill Center, VT (US); James A. Martin, Jr., Endicott, NY (US); Douglas G. Murray, Johnson City, NY (US); Diane C. Rauch, Sunset Beach, NC (US)

(73) Assignee: International Business Machines Corporation, Armonk, NY (US)

( * ) Notice: Subject to any disclaimer, the term of this patent is extended or adjusted under 35 U.S.C. 154(b) by 1246 days.

(21) Appl. No.: 11/245,386

(22) Filed: Oct. 6, 2005

(65) Prior Publication Data

US 2007/0083562 A1    Apr. 12, 2007

(51) Int. Cl.
G06F 9/46 (2006.01)
(52) U.S. Cl. ........................................................ 705/9
(58) Field of Classification Search ..................... 705/7, 705/9
See application file for complete search history.

(56) References Cited

U.S. PATENT DOCUMENTS

| | | | |
|---|---|---|---|
| 5,765,140 A | 6/1998 | Knudson et al. | |
| 5,793,632 A | 8/1998 | Fad et al. | |
| 6,047,129 A | 4/2000 | Frye | |
| 6,260,020 B1 | 7/2001 | Ruffin et al. | |
| 6,334,215 B1 | 12/2001 | Barker et al. | |
| 6,381,619 B1* | 4/2002 | Borowsky et al. | 707/204 |
| 7,113,923 B1 | 9/2006 | Brichta et al. | |
| 7,197,466 B1* | 3/2007 | Peterson et al. | 705/1 |
| 7,373,560 B1* | 5/2008 | Kingsley et al. | 714/700 |
| 2003/0130861 A1 | 7/2003 | Seitz | |
| 2005/0055402 A1* | 3/2005 | Sato | 709/205 |
| 2005/0086457 A1* | 4/2005 | Hohman | 713/1 |
| 2005/0125522 A1 | 6/2005 | DelGaudio et al. | |
| 2005/0262105 A1 | 11/2005 | DelGaudio et al. | |

OTHER PUBLICATIONS

Khosla et al (A Real Time Enterprise: A Continous Migration Approach), Mar. 2002, pp. 1-30.*
Vadhiyar (A Performance Oriented Migration Framework for the Grid), Dec. 2003, The Computer Society, pp. 1-8.*
Khosla (Real Time Enterprises—A Continous Migration Approach), Mar. 2002, pp. 1-30.*
Delgaudio, et al., U.S. Appl. No. 11/058,019, Amendment to Jul. 13, 2009 Office Action, dated Sep. 24, 2009.

(Continued)

*Primary Examiner*—Romain Jeanty
(74) *Attorney, Agent, or Firm*—Anna Linne; Hoffman Warnick LLC

(57) ABSTRACT

The present invention provides a computer-implemented method, tool, and program product for scheduling an IT migration. Specifically, under the present invention, migration information for the IT migration is received in an electronic database. A schedule to perform the IT migration is the generated based on the migration information using an IT migration tool. Thereafter, messages such as email messages that contain the schedule are generated and sent to corresponding device owners using the IT migration tool. In addition, purchase orders for components needed for the IT migration based on the migration information can be generated using the IT migration tool.

19 Claims, 5 Drawing Sheets

OTHER PUBLICATIONS

U.S. Appl. No. 11/058,019, filed Feb. 15, 2005, Office Action dated Jul. 13, 2009.

Boehm, et al., "SoftwareCost Estimation With Cocomo II", Prentice Hall PTR, 2000.

Davis, Megan, "Planning a Web Server Migration Project", Microsoft TechNet, Oct. 15, 1999.

Davis, Megan, "Understanding the Migration Process", Microsoft TechNet, Sep. 15, 1999.

"Your Guide to Price S- Estimating Cost and Schedule of Software Development and Support", Price Systems, LLC, 1998.

Duncan, William R, "A Guide to the Project Management Body of Knowledge", Project Management Institute, 1996.

Nelson, et al., "Application of a matrix approach to estimate project skill requirements", Information & Technology Management, vol. 29, 1995, pp. 165-172.

U.S. Appl. No. 11/058,019, filed Feb. 15, 2005, Office action dated Oct. 29, 2009.

* cited by examiner

| Building / Floor | Closet | Office | # | Port | Owner | Owner Serial | Department | Division | Migration Date |
|---|---|---|---|---|---|---|---|---|---|
| ▽ 967-01 | | | 47 | | | | | | |
| | ▽ Unknown | | 47 | | | | | | |
| | | ▽ 1-1E18'9 | 1 | 9671HC09 | Jewett Sr. Dennis | 548283 | LD9A | 07 | N |
| | | ▽ 1-1G1639 | 1 | 000000000000 | Meredith, James | 264556 | XVTA | 47 | N |
| | | ▽ 1-1K2030 | 1 | 9671GA15 | Jewett Sr. Dennis | 548283 | LD9A | 07 | N |
| | | ▽ 1-C1903 | 1 | 96711A24 | Rozich, William | 779477 | UWZA | 29 | N |

△ Mail List

80

- 06.0 Scheduling
- 06.02 Migration Date/Time
- 06.02 Migration Date/Status
- 06.03 By Building/Floor/Office (All Status
- 06.04 Migration Status/Date
- 06.05 Movers Needed (Open/Pending)
- 06.06 By Owner (Open/Pending)
- 06.07 Totals By Date
- 06.08 By Building/Office/Close (Open/Pe
- 06.09 By Date/Installer/Time (Open/Pen
- 06.10 Sell Installs By Building/Office/Clo
- 06.11 Shopping Cart By Building/Office/
- 06.12 Shopping Cart - Active Migrations
- 06.13 Rescheduling Required

FIG. 3

Mail List

| Reason Not Completed | Building / Floor | Request Sent? | Inventory Date | Office | Closet | Port | Owner <> |
|---|---|---|---|---|---|---|---|
| Needs static address | | | | | | | |
| | 966-01 | No | 04/28/2004 | 1P0710 | Unknown | 96642A31 | Webster, Kevin G. |
| Other(see comments) | | | | | | | |
| | 966-02 | No | 06/06/2004 | 2H1205 | Unknown | 9663MC15 | Trottier, Edward J. (Ed) |
| | | | 05/21/2004 | 2E0727 | Unknown | 9661KC15 | Garner, Jeff *VENDOR* |
| | | | 05/04/2004 | 2P0602 | Unknown | 96636C32 | Merril, Tavis S. |
| | | | 05/04/2004 | 2P0602 | Unknown | 96636B19 | Merril, Tavis S. |
| | | | 05/04/2004 | 2P0602 | Unknown | 96636D31 | Merril, Tavis S. |
| | | | 05/04/2004 | 2P0602 | Unknown | 96636C11 | Merril, Tavis S. |

- 06.0 Scheduling
  - 06.0 Migration Date/Time
  - 06.02 Migration Date/Status
  - 06.03 By Building/Floor/Office (A
  - 06.04 Migration Status/Date
  - 06.05 Movers Needed (Open/Pe
  - 06.06 By Owner (Open/Pending)
  - 06.07 Totals By Date
  - 06.08 By Building/Office/Close (
  - 06.09 By Date/Installer/Time (O
  - 06.10 Sell Installs By Building/Of
  - 06.11 Shopping Cart By Building
  - 06.12 Shopping Cart - Active Mig
  - 06.13 Rescheduling Required
  - 06.14 Rescheduled Machines
- 07.0 eMailed Inventory Process

COMPUTER-IMPLEMENTED METHOD, TOOL, AND PROGRAM PRODUCT FOR SCHEDULING AN INFORMATION TECHNOLOGY (IT) MIGRATION

CROSS-REFERENCE TO RELATED APPLICATION

This application is related in some aspects to commonly assigned U.S. application Ser. No. 11/058,019 entitled "System and Method For Resource And Cost Planning of an IT Migration, filed Feb. 15, 2005, the entire contents of which are herein incorporated by reference

BACKGROUND OF THE INVENTION

1. Field of the Invention

The present invention generally relates to IT migrations. Specifically, the present invention provides a tool that consolidates and coordinates the scheduling of IT migrations.

2. Related Art

As Information Technology (IT) continues to advance, many organizations are faced with the task of migrating their existing computer infrastructures, telephone systems and the like to newer technology. For example, an organization might wish to migrate its networking functions from token ring to Ethernet. Similarly, an organization might wish to migrate its telephone service from landline-based service to voice-over-IP service.

An IT migration cannot only involve adding components such as hardware or software, but it can also involve the physical relocation of existing devices and/or components. To this extent, there is often the need to provide precise scheduling of the activities involved with the IT migration. That is, the owners of the devices need to know when they need to take certain actions, and the project staff that is performing or assisting with the migration needs to be scheduled by the project management team. The schedule can be arranged beforehand by making appointments with each individual owner, or the schedule can be more general (e.g., by notifying the owners that their devices will be migrated during a certain time period, such as the morning of a certain day). In the latter case the project team members will have the latitude to migrate devices as they are encountered, within the limits that have determined ahead of time (e.g., a portion of a particular floor in a building will be migrated during the morning of a certain day).

No matter what form the schedule takes, the project management team needs to match up the available labor resources with the devices to be migrated and develop the migration schedule. Many factors come into play, such as: the type of device being migrated; software that may be running on the device (e.g., the operating system, if the device is a computer); the location of the device; the availability of the owner (if the owner needs to be present for any reason); an available time window for critical devices that have restrictions on their down time; the network connectivity (e.g., which network infrastructure devices in which closet serves the device); environmental conditions (e.g., there may be heavy furniture that is blocking a network or telephone port, and movers will need to be scheduled as part of the migration, or there may be modifications required to the workspace to accommodate a new piece of equipment, such as a new monitor); the availability of team members with specific skills needed for particular devices, such as printers or machines running UNIX; etc.

Heretofore, these migration scheduling activities have been done using a plurality of disparate resources such as spreadsheets, calendars, whiteboards, or scheduling programs on PCs. Matching up the resources with thousands of devices can be a daunting task that takes hours of planning and is prone to error. If changes are needed, manual steps may need to be repeated, increasing costs and delaying the schedule. This makes changes unattractive and the schedule rigid.

In view of the foregoing there exists a need for a tool that organizes the information needed to perform the migration, and generates a single, cohesive schedule.

SUMMARY OF THE INVENTION

In general, the present invention provides a computer-implemented method, tool, and program product for scheduling an IT migration. Specifically, under the present invention, migration information for the IT migration is received in an electronic database. A schedule to perform the IT migration is the generated based on the migration information using an IT migration tool. Thereafter, messages such as email messages that contain the schedule are generated and sent to corresponding device owners using the IT migration tool. In addition, purchase orders for components needed for the IT migration based on the migration information can be generated using the IT migration tool.

Under the present invention, the migration information can include any type of information needed to perform the IT migration such as types of devices undergoing the IT migration, software running on the devices, locations of the devices, an availability of owners of the devices, available time windows, network connectivity for the devices, environmental conditions for the devices, etc. The present invention can also generate a set of electronic views of the migration information and the schedule. Still yet, the present invention allows the IT migration to be rescheduled as necessary.

A first aspect of the present invention provides a computer-implemented method for scheduling an Information Technology (IT) migration, comprising: receiving migration information in an electronic database; generating a schedule to perform the IT migration based on the migration information using an IT migration tool; generating and sending migration messages containing the schedule to corresponding device owners using the IT migration tool; and generating purchase orders for components needed for the IT migration based on the migration information using the IT migration tool.

A second aspect of the present invention provides a tool for scheduling an Information Technology (IT) migration, comprising: a system for storing migration information in an electronic database; a system for generating a schedule to perform the IT migration based on the migration information; a system for generating and sending migration messages containing the schedule to corresponding device owners; and a system for generating purchase orders for components needed for the IT migration based on the migration information.

A third aspect of the present invention provides a program product stored on a computer readable medium for scheduling an Information Technology (IT) migration, the computer readable medium comprising program code for causing a computer system to perform the following steps: receiving migration information in an electronic database; generating a schedule to perform the IT migration based on the migration information; generating and sending migration messages containing the schedule to corresponding device owners; and generating purchase orders for components needed for the IT migration based on the migration information.

A fourth aspect of the present invention provides a method for deploying an application for scheduling an Information Technology (IT) migration, comprising: providing a computer infrastructure being operable to: receive migration information in an electronic database; generate a schedule to perform the IT migration based on the migration information; generate and send migration messages containing the schedule to corresponding device owners; and generate purchase orders for components needed for the IT migration based on the migration information.

A fifth aspect of the present invention provides computer software embodied in a propagated signal for scheduling an Information Technology (IT) migration, the computer software comprising instructions for causing a computer system to perform the following functions: receive migration information in an electronic database; generate a schedule to perform the IT migration based on the migration information; generate and send migration messages containing the schedule to corresponding device owners; and generate purchase orders for components needed for the IT migration based on the migration information.

Therefore, the present invention provides a computer-implemented method, tool, and program product for scheduling an IT migration.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 3 shows another illustrative electronic view according to the present invention.

FIG. 4 shows another illustrative electronic view according to the present invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the present invention provides a computer-implemented method, tool, and program product for scheduling an IT migration. Specifically, under the present invention, migration information for the IT migration is received in an electronic database. A schedule to perform the IT migration is the generated based on the migration information using an IT migration tool. Thereafter, messages such as email messages that contain the schedule are generated and sent to corresponding device owners using the IT migration tool. In addition, purchase orders for components needed for the IT migration based on the migration information can be generated using the IT migration tool.

Figure 1:
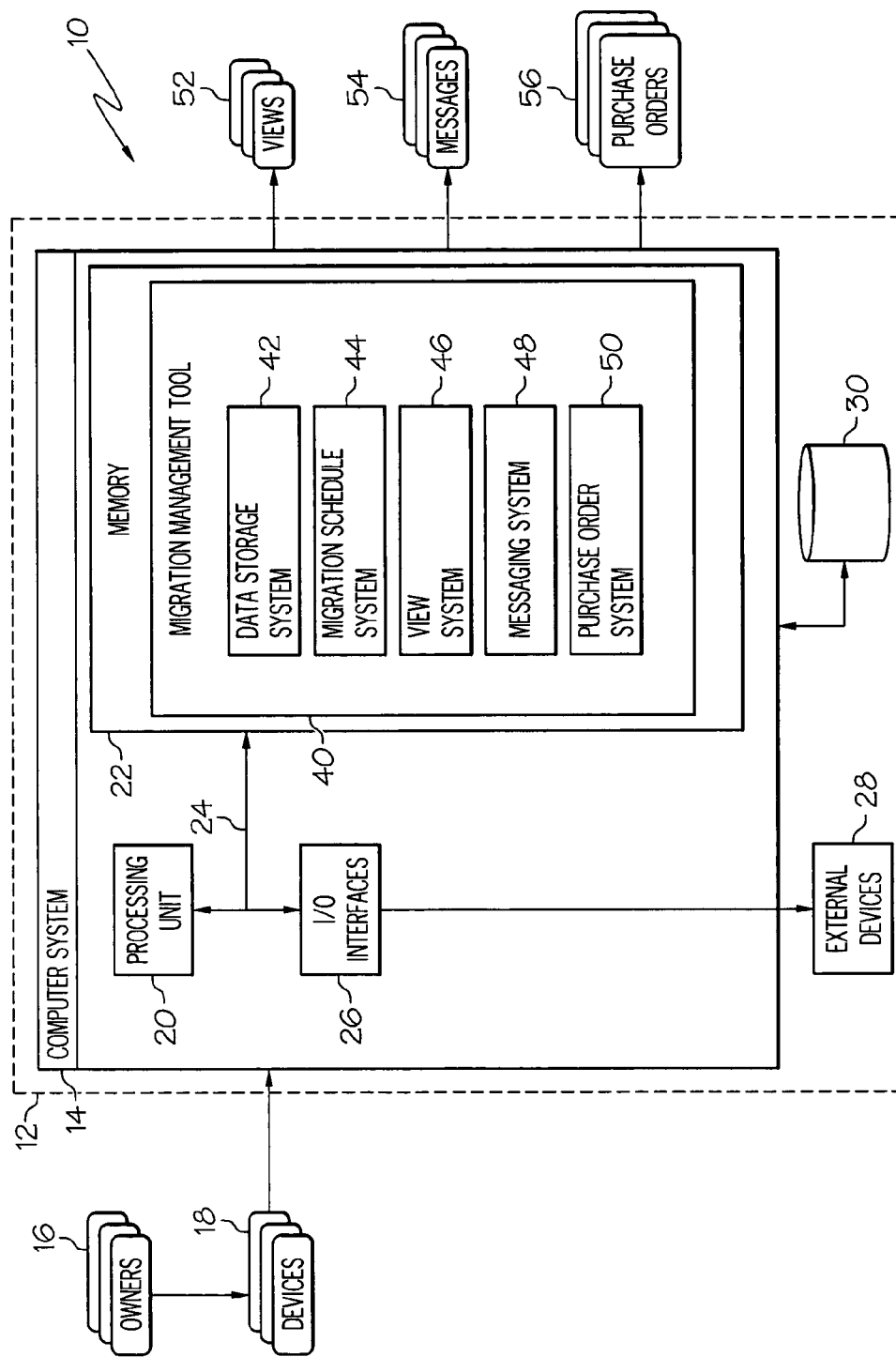
FIG. 1 shows an illustrative system for scheduling an IT migration according to the present invention.

Referring now to FIG. 1, a system 10 for scheduling an IT migration according to the present invention is shown. Specifically, FIG. 1 depicts a system 10 in which information for an IT migration (migration information) can be centrally stored, managed, used to schedule an IT migration on an on-demand basis. In addition, system 10 allows electronic views 52 containing the migration information to be generated and displayed. As depicted, system 10 includes a computer system 14 deployed within a computer infrastructure 12. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 12 is intended to demonstrate that some or all of the components of system 10 could be deployed, managed, serviced, etc. by a service provider who offers to scheduling an IT migration.

As shown, computer system 14 includes a processing unit 20, a memory 22, a bus 24, and input/output (I/O) interfaces 26. Further, computer system 14 is shown in communication with external I/O devices/resources 28 and storage system 30. In general, processing unit 20 executes computer program code, such as migration management tool 40, which is stored in memory 22 and/or storage system 30. While executing computer program code, processing unit 20 can read and/or write data to/from memory 22, storage system 30, and/or I/O interfaces 26. Bus 24 provides a communication link between each of the components in computer system 14. External devices 28 can comprise any devices (e.g., keyboard, pointing device, display, etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, computer system 14 is only representative of various possible computer systems that can include numerous combinations of hardware. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 20 may comprise a single processing unit, or be distributed across one or more processing units in one or more locations, e.g., on a client and server. Similarly, memory 22 and/or storage system 30 can comprise any combination of various types of data storage and/or transmission media that reside at one or more physical locations. Further, I/O interfaces 26 can comprise any system for exchanging information with one or more external devices 28. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 28 (e.g., a display) and/or storage system(s) 30 could be contained within computer system 14, not externally as shown.

Storage system 30 can be any type of system (e.g., a database) capable of providing storage for information under the present invention, such as migration information, schedules etc. To this extent, storage system 30 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into computer system 14.

Shown in memory 22 of computer system 14 is migration management tool 40, which is a software program that will provide the functions of the present invention, and which includes data storage system 42, migration schedule system 44, view system 46, messaging system, and purchase order system 50.

Assume in an illustrative embodiment that certain devices 18 (e.g., computer workstations) operated by owners 16 are undergoing an IT migration in the form of migration of devices 18 to Ethernet connectivity. Further assume that the IT migration involves the procurement and addition of new components (e.g., hardware components or software components) to devices 18. As indicated above, various pieces of migration information could be needed to properly plan and carry out the IT migration. Such information can include, for example, the type of device being migrated; software that may be running on the device (e.g., the operating system, if the device is a computer); the location of the device; the availability of the owner (if the owner needs to be present for any reason); components (e.g., hardware and software components) needed for the IT migration an available time window for critical devices that have restrictions on their down time; the network connectivity (e.g., which network infrastructure devices in which closet serves the device); environmental conditions (e.g., there may be heavy furniture that is blocking a network or telephone port, and movers will need to be scheduled as part of the migration, or there may be modifications required to the workspace to accommodate a new piece of equipment, such as a new monitor); the availability of team members with specific skills needed for particular devices, such as printers or machines running UNIX.; etc.

In previous systems such information was generally collected and stored in a variety of disparate systems, with significant manual efforts required. Under the present invention, all migration information needed to carry out the IT migration will be received by data storage system 42 and stored in storage system 30. Using the information, migration schedule system 44 will generate a schedule for performing the IT migration. The schedule will be based on any factors that could be influential such as an availability of people performing the migration (not shown), an availability of owners 16 of the devices or the devices 18 themselves, an availability of needed components, etc.

Figure 2:
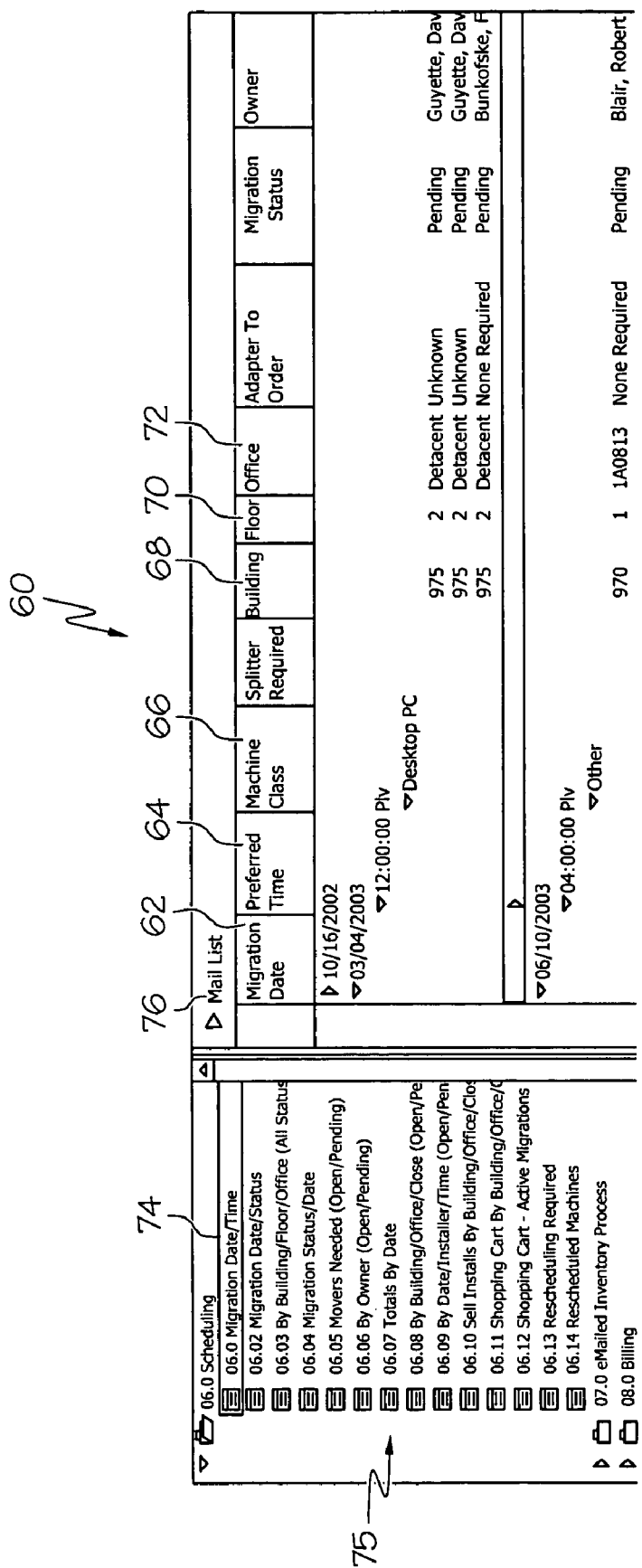
FIG. 2 shows an illustrative electronic view according to the present invention.

Regardless, view system 46 can generate and display a set (e.g., one or more) of electronic views 52 containing the migration information and the schedule generated by migration schedule system 44. Referring to FIG. 2, a first illustrative electronic view 60 is shown. As depicted, view 60 sets forth schedule information for the IT migration. Specifically, as shown, view 60 sets forth migration dates 62 and preferred times 64. View 60 provides information about the device(s) undergoing the IT migration such as machine class 66 and location information (e.g., building 68, floor 70 and office 72).

In general, the electronic views provided under the present invention are arranged in a button-based hierarchical format whereby information can be expanded or collapsed. For example, the information for the migration date of Oct. 16, 2002 shown in view 60 is collapsed while the information for the migration date of Mar. 4, 2003 is expanded. In addition, each view such as view 60 includes a title pane 74 that lists the titles 75 of available electronic views. Selection of a particular title 75 in title pane 74 would cause the corresponding view to be generated and displayed by view system 46. Furthermore the views provided under the present invention could include a "mail list" button 76. Selection of mail list button 76 would cause messaging system 48 of FIG. 1 to generate a distribution list and corresponding migration messages 54 (FIG. 1) for mailing information to owners 16 of selected devices 18, such as people who are scheduled for migration during a specific time period. To this extent, messaging system 48 could provide an interface for an administrator or the like to provide criteria that will determine what messages 54 are generated and to whom. In addition, it should be understood that the messages 54 generated and sent by messaging system 48 are typically electronic messages such as electronic mail messages.

Referring to FIG. 3, another illustrative electronic view 80 according to the present invention is shown. Specifically, FIG. 3 depicts the devices organized by network closet that provides their Ethernet connection. In this illustrative Ethernet migration project, the migrations were scheduled by wiring closet, building and floor to match up the available resources to that particular group. Referring to FIG. 4, yet another illustrative electronic view 90 is depicted. View 90 is shown to illustrate the rescheduling capabilities of the present invention. Specifically, if for some reason a schedule migration cannot be kept, migration schedule system 44 will receive the necessary input and reschedule the IT migration as needed. To this extent, view 90 includes any reasons why the IT migration was not completed.

Figure 5:
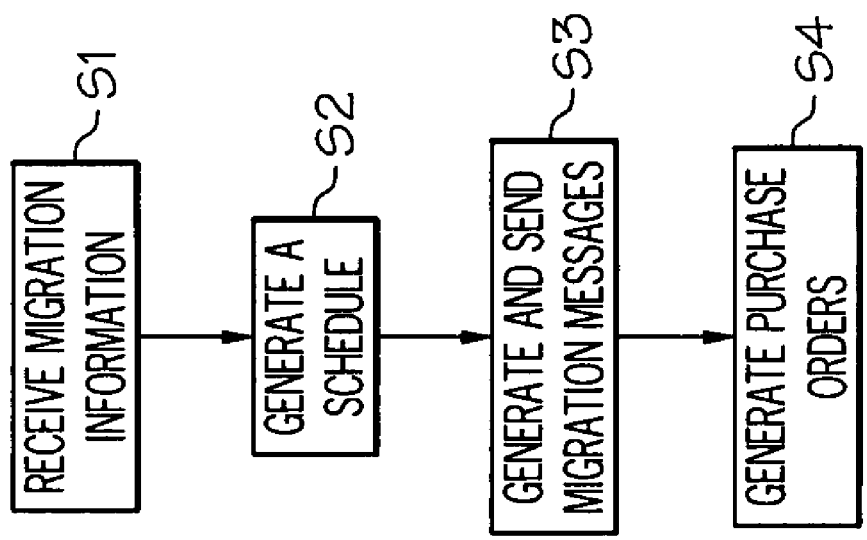
FIG. 5 shows an illustrative method flow diagram according to the present invention.

Referring back to FIG. 1, IT migration tool 40 also includes a purchase order system 50. Based on the migration information (e.g., needed components) and current inventory, purchase order system 50 will generate and send any needed purchases orders 56. Specifically, if a certain quantity of a certain network adapter that is needed for the IT migration is not in stock, purchase order system 50 will generate and send purchase orders 56 as necessary Referring now to FIG. 5, a method flow diagram according to the present invention is shown. As depicted, first step is to receive migration information in an electronic database. Second step S2 is to generate a schedule to perform the IT migration based on the migration information using an IT migration tool. Third step S3 is to generate and send migration messages containing the schedule to corresponding device owners using the IT migration tool. Fourth step S4 is to generate purchase orders for components needed for the IT migration based on the migration information using the IT migration tool.

While shown and described herein as a method and system for scheduling an IT migration, it is understood that the invention further provides various alternative embodiments. For example, in one embodiment, the invention provides a computer-readable/useable medium that includes computer program code to enable a computer infrastructure to schedule IT migration. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 30 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer schedule an IT migration. In this case, the service provider can create, maintain, support, etc., a computer infrastructure, such as computer infrastructure 12 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for scheduling an IT migration. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A computer-implemented method performed on at least one computing device, for scheduling an Information Technology (IT) migration, comprising:
   receiving, using the at least one computing device, migration information in an electronic database, wherein the migration information comprises: types of devices undergoing the IT migration, software running on the devices, locations of the devices, an availability of owners of the devices, available time windows of people performing the migration, network connectivity for the devices, and environmental conditions for the devices;
   automatically generating, using the at least one computing device, a schedule to perform the IT migration based on the migration information, wherein the automatically generating of the schedule includes:
      determining the locations of the devices;
      determining the availability of the owners of the devices at the locations;
      determining the available time windows of the people performing the migration based upon the locations of the devices;
      determining an availability of the needed components to migrate the devices from the electronic inventory; and
      generating the schedule by matching the availability of the owners of the devices with: at least one of the available time windows of the people performing the migration and the availability of the needed components to migrate the devices;
   generating and sending, using the at least one computing device, migration messages containing the schedule to corresponding device owners;
   automatically generating, using the at least one computing device, purchase orders for components needed for the IT migration based on the migration information, in the case that the components needed are indicated as not present in an electronic inventory; and
   generating, using the at least one computing device, a plurality of hierarchical electronic views setting forth the migration information and the schedule, wherein the plurality of hierarchical electronic views are navigable within a single window using a hierarchical tree, each view presenting a unique subset of the migration information using a hierarchical structure.

2. The computer-implemented method of claim 1, wherein the migration messages are electronic mail messages.

3. The computer-implemented method of claim 1, further comprising rescheduling the IT migration, using the at least one computing device, the rescheduling based upon an unavailability of at least one of: the device undergoing the IT migration, the owner of the device, the people performing the migration, and the network connectivity for the device.

4. The computer-implemented method of claim 3, wherein at least one of the plurality of electronic views further sets forth a reason for the rescheduling of the IT migration.

5. The computer-implemented method of claim 1, wherein the components are selected from the group consisting of hardware components and software components.

6. The computer-implemented method of claim 1, wherein the schedule shown in at least one of the plurality of electronic views includes a migration date and a preferred time.

7. A tool for scheduling an Information Technology (IT) migration, comprising:
   a system for storing migration information in an electronic database, wherein the migration information comprises types of devices undergoing the IT migration, software running on the devices, locations of the devices, an availability of owners of the devices, available time windows of people performing the migration, network connectivity for the devices, and environmental conditions for the devices;
   a system for automatically generating a schedule to perform the IT migration based on the migration information, wherein the system for automatically generating the schedule automatically generates the schedule, using at least one computing device, by:
      determining the locations of the devices;
      determining the availability of the owners of the devices at the locations;
      determining the available time windows of the people performing the migration based upon the locations of the devices;
      determining an availability of the needed components to migrate the devices from the electronic inventory; and
      generating the schedule by matching the availability of the owners of the devices with: at least one of the available time windows of the people performing the migration and the availability of the needed components to migrate the devices;
   a system for generating and sending migration messages containing the schedule to corresponding device owners;
   a system for automatically generating purchase orders for components needed for the IT migration based on the migration information, in the case that the components needed are indicated as not present in an electronic inventory; and a system for generating a plurality of hierarchical electronic views setting forth the migration information and the schedule, wherein the plurality of hierarchical electronic views are navigable within a single window using a hierarchical tree, each view presenting a unique subset of the migration information using a hierarchical structure.

8. The system of claim 7, wherein the migration messages are electronic mail messages.

9. The system of claim 7, further comprising a system for rescheduling the IT migration using the tool.

10. The system of claim 9, wherein the plurality of electronic views further set forth a reason for the rescheduling of the IT migration.

11. The system of claim 7, wherein the components are selected from the group consisting of hardware components and software components.

12. The system of claim 7, wherein the plurality of hierarchical electronic views includes a scheduling view, a billing view and an emailed inventory process view.

13. A program product stored on a computer readable medium for scheduling an Information Technology (IT) migration, the computer readable medium comprising program code, which when executed on at least one computing device, causes the at least one computing device to perform the following:

receiving migration information in an electronic database, wherein the migration information comprises: types of devices undergoing the IT migration, software running on the devices, locations of the devices, an availability of owners of the devices, available time windows of people performing the migration, network connectivity for the devices, and environmental conditions for the devices;

automatically generating a schedule to perform the IT migration based on the migration information, wherein the automatically generating of the schedule includes:

determining the locations of the devices;

determining the availability of the owners of the devices at the locations;

determining the available time windows of the people performing the migration based upon the locations of the devices;

determining an availability of the needed components to migrate the devices from the electronic inventory; and generating the schedule by matching the availability of the owners of the devices with: at least one of the available time windows of the people performing the migration and the availability of the needed components to migrate the devices;

generating and sending migration messages containing the schedule to corresponding device owners;

automatically generating purchase orders for components needed for the IT migration based on the migration information, in the case that the components needed are indicated as not present in an electronic inventory; and generating a plurality of hierarchical electronic views setting forth the migration information and the schedule, wherein the plurality of hierarchical electronic views are navigable within a single window using a hierarchical tree, each view presenting a unique subset of the migration information using a hierarchical structure.

14. The program product of claim 13, wherein the migration messages are electronic mail messages.

15. The program product of claim 13, wherein the computer readable medium further comprises program code for performing the following step: rescheduling the IT migration.

16. The program product of claim 13, wherein the components are selected from the group consisting of hardware components and software components.

17. The program product of claim 13, wherein the schedule shown in the electronic view includes a migration date and a preferred time.

18. A method for deploying an application for scheduling an Information Technology (IT) migration, comprising:

providing at least one computing device being operable to perform the following:

receiving migration information in an electronic database, wherein the migration information comprises: types of devices undergoing the IT migration, software running on the devices, locations of the devices, an availability of owners of the devices, available time windows of people performing the migration, network connectivity for the devices, and environmental conditions for the devices;

automatically generating a schedule to perform the IT migration based on the migration information, wherein the automatically generating of the schedule is performed on the at least one computing device and includes:

determining the locations of the devices;

determining the availability of the owners of the devices at the locations;

determining the available time windows of the people performing the migration based upon the locations of the devices;

determining an availability of the needed components to migrate the devices from the electronic inventory; and generating the schedule by matching the availability of the owners of the devices with: at least one of the available time windows of the people performing the migration and the availability of the needed components to migrate the devices;

generating and sending migration messages containing the schedule to corresponding device owners;

automatically generating purchase orders for components needed for the IT migration based on the migration information, in the case that the components needed are indicated as not present in an electronic inventory; and generating a plurality of hierarchical electronic views setting forth the migration information and the schedule, wherein the plurality of hierarchical electronic views are navigable within a single window using a hierarchical tree, each view presenting a unique subset of the migration information using a hierarchical structure.

19. The method of deploying of claim 18, wherein the plurality of hierarchical electronic views includes a scheduling view, a billing view and an emailed inventory process view.

* * * * *